Aug. 9, 1932.  C. A. BULKELEY  1,871,256
WELDED HEATER ASSEMBLY OF ALUMINUM OR THE LIKE
Filed Oct. 30, 1929  2 Sheets-Sheet 1
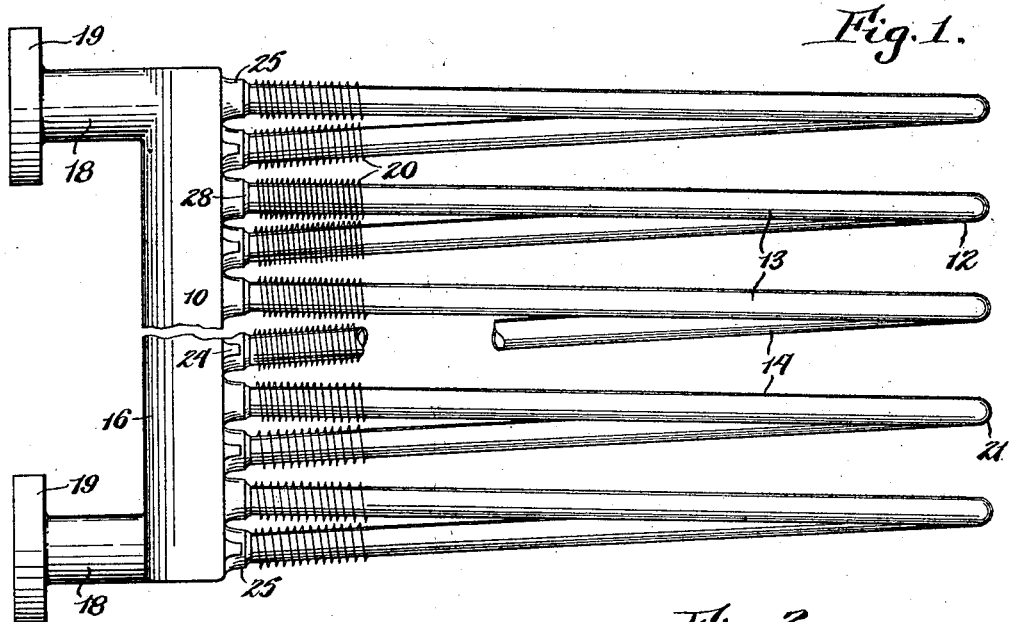
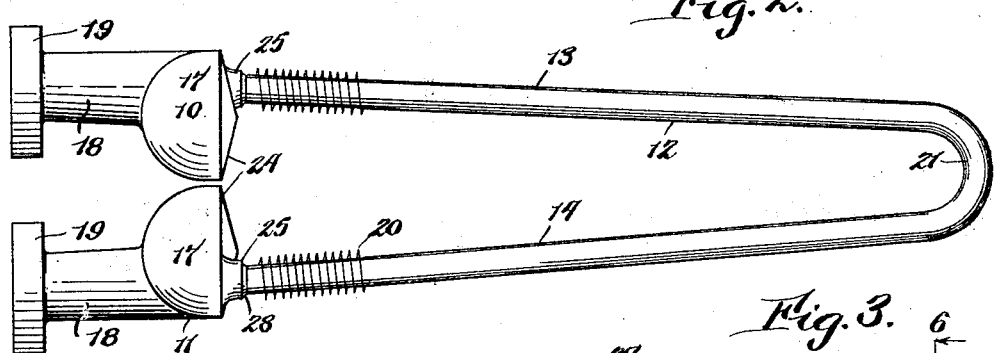
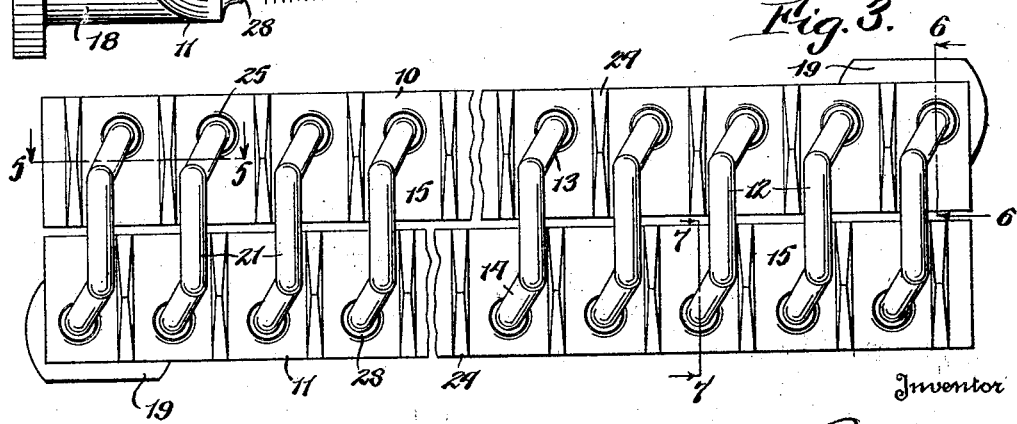
Inventor
Claude A. Bulkeley
By Popp and Powers
Attorneys Aug. 9, 1932. C. A. BULKELEY 1,871,256
WELDED HEATER ASSEMBLY OF ALUMINUM OR THE LIKE
Filed Oct. 30, 1929 2 Sheets-Sheet 2
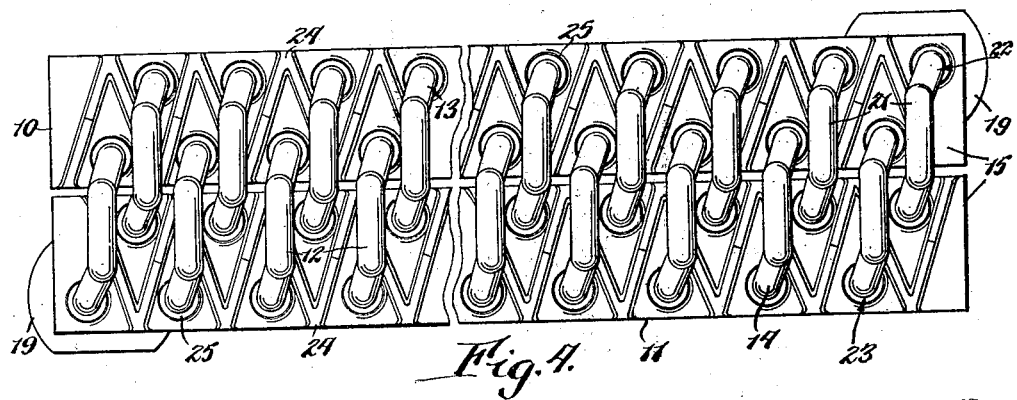
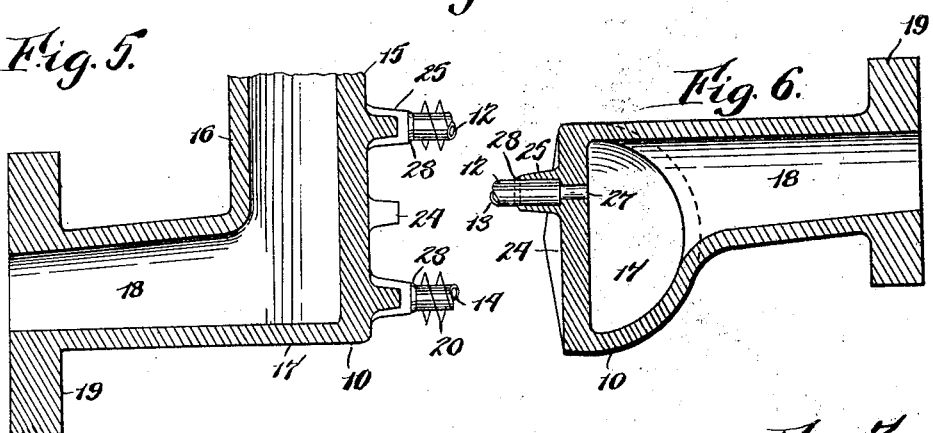
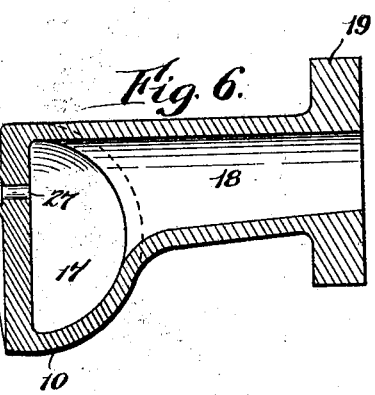
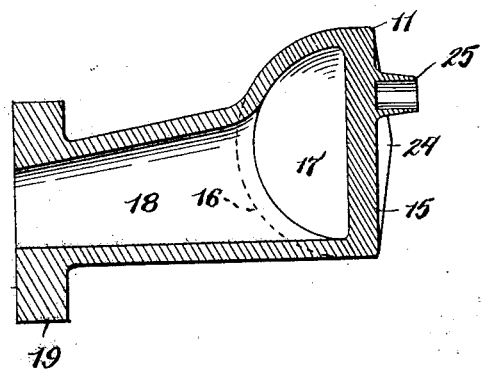
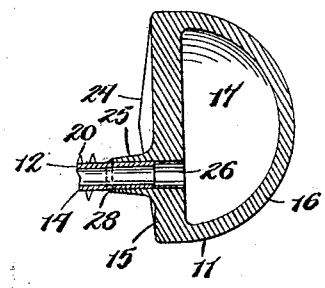
Inventor
Claude A. Bulkeley
By Popp and Powers
Attorneys Patented Aug. 9, 1932

1,871,256

UNITED STATES PATENT OFFICE

CLAUDE A. BULKELEY, OF KENMORE, NEW YORK, ASSIGNOR TO NIAGARA BLOWER COMPANY, OF BUFFALO, NEW YORK, A CORPORATION OF NEW YORK

WELDED HEATER ASSEMBLY OF ALUMINUM OR THE LIKE

Application filed October 30, 1929. Serial No. 403,496.

This invention relates to a welded heater assembly of aluminum or the like and more particularly to a heater composed of cast aluminum headers to which the ends of sheet aluminum tubes are welded, the tubes being either plain or provided with fins to increase the transfer of heat. The present invention is an improvement on the heater shown and described in my copending application for air heater and method of making the same, Serial No. 319,434, filed November 14, 1928, and the present heater assembly is not only intended for use in connection with fan heaters and air conditioners, but is also intended for use in general heating work.

The principal object of this invention is to provide a heater assembly having cast aluminum headers, each of which is made in one piece and of sufficient strength to withstand the steam pressure without yielding and to which headers the ends of the sheet metal tubes are welded, the welding being done entirely upon the exterior of the header and tubes and the header being so formed that the metal of both the cast aluminum header and the thin sheet aluminum tube walls are fused before the thin sheet aluminum walls of the tubes are melted. By this means, the headers can be completely cast and tested for blow holes or other imperfections before any welding whatsoever is done, and thereafter the tubes are welded to the two headers, the welding being done entirely from the exterior of the work. Upon completing the assembly it can be tested and if any imperfections are found in the welds, they can be repaired without difficulty.

A further aim is to provide such a heater assembly in which each header is made of cast aluminum of sufficient thickness and adequately reinforced to withstand the steam pressure, and in which the tubes are made of sheet aluminum. By this means a strong and durable assembly is provided which is not only non-corrosive but is also much lighter and more easily handled than a steel heater assembly and is actually less expensive than a steel assembly.

A further aim is to provide a single piece cast header for such a heater assembly in which the orifices connecting the interior of the header and the tubes can be drilled to the proper size after the header is cast and tested, thereby eliminating the necessity for casting different headers having the desired sizes of orifices.

In the accompanying drawings:

Figure 1 is a top plan or face view of an aluminum heater assembly made in accordance with my invention, fin surfacing being indicated on the tubes.

Figure 2 is a side elevation thereof.

Figure 3 is an end elevation thereof viewed from the ends of the hairpin tubes.

Figure 4 is view similar to Fig. 3 showing a double row of staggered hairpin tubes arranged as set forth in my said copending application, Serial No. 319,434, filed November 14, 1928.

Figure 5 is a fragmentary horizontal section through the upper header, taken on line 5—5, Fig. 3.

Figure 6 is a vertical section through the upper header taken on line 6—6, Fig. 3.

Figure 7 is a vertical section through the lower header taken on line 7—7, Fig. 3.

Figure 8 is a vertical section through either header and its steam connection, showing the header preparatory to being tested for casting imperfections.

In its general organization, this invention comprises an upper single piece cast aluminum header 10, a lower single piece cast aluminum header 11 and a plurality of sheet metal hairpin tubes 12 the upper legs 13 of which are welded from the exterior to the upper header 10 and the lower legs 14 thereof being welded from the exterior to the lower header 11. The upper and lower headers 10 and 11 are identical in form, the same castings being used for both headers. Each of these headers comprises a vertical inner wall 15 forming the tube sheet, a semi-circular outer header wall 16 formed integrally with the tube sheet 15 and enclosed by end walls 17 and an integrally formed steam connection stem 18 arranged at one end of the header and having the usual attaching flange 19 by means of which the two headers are connected to the steam supply and condensation drain, neither of which is shown.

The legs 13 and 14 of the tubes can be provided with a fin surface indicated at 20 if desired and the legs are spread apart at their ends welded to the headers and are preferably horizontally offset relative to one another, as indicated in Figs. 1, 3 and 4, the bends 21 of the tubes being vertically disposed. By this means an adequate draining gradient is provided when the headers are horizontally disposed since the legs of the tubes are spread apart, and when the headers are vertically disposed an adequate draining gradient is also maintained by reason of the laterally offset condition of the legs 13 and 14 relative to the bends 21 and relative to one another as indicated in Fig. 1. These tubes can either be provided in a single series as indicated in Figs. 1–3, or two series can be provided, as shown in Fig. 4, the upper series 22 being offset or staggered relative to the lower series 23, and the tubes being spaced according to the disclosure of my said copending application Serial No. 319,434, filed November 14, 1928.

Various attempts have been made to provide an all aluminum heater assembly of this general character, the first step being to construct separate tube sheets and header walls, weld the tubes to the tube sheets from the inside of the tube sheets and then weld the tube sheets to the header walls. This did not permit of testing the assembly until it was completely welded and if after testing it were found that a tube had not been properly welded to the tube sheet, since the weld was not exposed, an opening had to be cut into the header before the repair could be made. An attempt was also made to weld the tubes to the tube sheets from the exterior, but it was found that since a thick tube sheet had to be provided to withstand the steam pressure if aluminum were used, the welding heat would not fuse the surface of the tube sheet but would be rapidly conducted away whereas the walls of the sheet aluminum tubes would melt.

The present invention eliminates this difficulty by reinforcing the tube sheet with a plurality of ribs 24 and by forming a plurality of thin walled nipples 25 on the tube sheets among the ribs, these nipples projecting vertically a substantial distance from the tube sheet 15. Where each nipple joins the tube sheet, the nipple wall is of considerably greater thickness than the tube walls. Each nipple from its junction with the tube sheet has an essentially straight outside taper to the end where it has approximately the same wall thickness as that of the tube. This tapering of the nipples greatly facilitates the welding of the tubes to the nipples for the reason that at the end of the nipples where the welds are made to the tube walls, if the two walls are of the same thickness of metal, they fuse simultaneously to form a perfect weld. It is essential that the nipple wall increase in thickness toward the tube sheet end for two reasons, first that proper mechanical strength be obtained where the nipple joins the tube sheet and second that since in fusing the two parts for welding, the heating flame is directed against each tube wall and the end of the nipple at an angle toward the tube sheet and since the nipple wall gradually thickens toward the tube sheet it fuses more quickly at the end where it is essential that the weld be made. On the other hand if the nipple has too great a taper, that is, has too great a wall thickness at tube sheet end, the heat will be conducted from the nipple to the relatively large mass of metal in tube sheet so rapidly as to cause the tube wall to fuse in advance of the nipple, resulting in a stuffing of the tube without a weld being accomplished. These nipples communicate with the interior of the header by holes drilled through the tube sheet inside of the nipples, the holes 26 of the lower or return header being drilled out to the full internal dimensions of the nipples 24 and the holes 27 of the upper header being of smaller size to insure the distribution of the steam through all of the hairpin tubes in accordance with standard practice and the ends of the tubes are then inserted into the nipples and the weld, indicated at 28, is effected between the walls of the tubes and the ends of the nipples 25. Since the nipples 25 are comparatively long and thin walled, the welding heat is not immediately conducted away and dissipated in the thick tube sheet 15, but the end of the nipple 25 is fused in the same time that the outer surface of the adjacent sheet metal aluminum tubes is fused so that a perfect weld can be obtained without melting the thin walled tube.

The ribs 24 permit of the use of a much thinner tube sheet to withstand the steam pressure without yielding or becoming distorted than would be required if these ribs were not provided and thereby reduce the tendency of the tube sheet to dissipate the welding heat. These ribs are preferably higher at their center than at their ends and in the form of the invention shown in Figs. 1–3 where a single row of tubes is provided, these ribs are arranged at right angles to the length of the headers, and where a double row of tubes is provided, as shown in Fig. 4, these ribs are arranged at an angle and connected at their ends. In both forms, each tube end is supported at its opposite sides by two of the ribs 24.

Care must be exercised in proportioning the parts to secure the desired result in welding the assembly, since if the nipple 25 is not long enough or thin walled enough or if the tube sheet 15 is too thick the weld heat will be dissipated in the tube sheet and difficulty encountered in welding the tubes. The conditions will also be altered when different materials or alloys are used, and an alloy for the headers should be chosen which will not crack in heating and will fuse at the same temperature as the tubes so that leaky welds will not result. A satisfactory heater assembly has been made employing an aluminum alloy for the cast headers, this alloy consisting of 5% silicon and the balance 99–99½% commercially pure aluminum. This alloy lends itself to a perfect casting and at the same time a perfect weld can be obtained between the commercially pure sheet aluminum tubing and the nipples 25 extending out from the tube sheet. In such a header, a tube sheet 15 of ½ inch thickness reinforced by the ribs 24 will withstand the steam pressure and by making the nipples 25 at least ¾ of an inch high, and employing 16 Brown and Sharp gage thin aluminum tubing, or maintaining like proportions in other assemblies, no difficulty will be encountered in securing a perfect weld between the tubes and the nipples.

In making a heater assembly in accordance with the present invention, the aluminum headers are each first cast in one piece complete with the steam connection stem 18, tube sheet 15, header wall 17, ribs 24, and nipples 25, the nipples 25 being arranged to receive the staggered legs 13 and 14 of the tubes on the manner described so as to insure the proper drainage gradient in both the horizontal and vertical position of the headers. In this condition the headers are unprovided with the holes 26 and 27 leading to the nipples 25 and the headers can each be tested for any imperfections in the casting thereby eliminating the possibility of finding a blow hole after the assembly is complete. The headers are then drilled out, those headers to be used as the lower or return headers 11 being drilled, as indicated at 26, to the full internal size of the nipples and the upper headers 10 being provided with holes 27 of reduced size so that the steam is distributed through the tubes. The tubes 12 are then welded at the ends of their legs 13 and 14 to the nipples 25, the ends of the legs being inserted in the nipples 25 and the weld 28 being effected at the outer rim of the nipples 25 and the outer tube walls, both being fused to provide a perfect weld. The entire assembly can then be tested and if there is any defect in any of the welds 28, this defect can be readily cured.

Since the heater assembly is all aluminum, the assembly weighs one quarter as much as steel and is less subject to corrosion; the headers being cast in one piece can be tested for tightness before any work is done on the same and can be rejected before any assembly work is performed if a sand hole or flaw should develop; since the tube sheet of each header is cast solid and later drilled out to communicate with the tubes, all that is necessary to provide the proper equalization of flow of steam through the tubes is to drill the tube sheet of the inlet header for the proper sizes of orifices; and since the only welding is that between the nipples and the tube, the assembly is not only entirely accessible to weld but should any weld prove defective it can be repaired without any loss of material or labor already expended on the heater assembly. Moreover the welding of the thin sheet aluminum tubes to the thin walled ends of nipples insures a proper fusing of the walls of each and a perfect weld, the welding heat applied to the nipples not being conducted away and dissipated in the thick tube sheet with the result that the nipple is not fused and the sheet aluminum tube melted as would be the case if such thin walled nipples were not provided.

I claim as my invention:

1. A heater structure, comprising a metal header formed to provide a header wall and a tube sheet, a comparatively thin walled coil welded to said tube sheet, and reinforcing ribs formed on the outer side of said tube sheet.

2. A heater structure, comprising a metal header cast in one piece and formed to provide a header wall, a tube sheet, nipples projecting outwardly from said tube sheet and a plurality of ribs formed on the outer side of said tube sheet between said nipples and reinforcing said tube sheet and coils welded to said nipples.

3. A heater structure, comprising a metal header cast in one piece and formed to provide a tube sheet, a header wall enclosing one side of said tube sheet, comparatively thin walled nipples projecting outwardly from said tube sheet and a plurality of ribs formed on the outer side of said tube sheet between said nipples and reinforcing said tube sheet, said tube sheet having drilled holes surrounded by said nipples and coils inserted in said nipples, the edges of said nipples being welded to the outer walls of said coils.

4. A heater structure, comprising a header including a tube sheet having a plurality of outwardly projecting ribs formed on its outer face and a plurality of tubes secured to said tube sheet intermediate said ribs and communicating with the interior of the header.

5. A heater structure, comprising a soft metal header cast in one piece and formed on one side to provide a flat tube sheet and reinforcing ribs projecting outwardly from said tube sheet, and a plurality of tubes secured to said tube sheet intermediate said ribs and communicating with the interior of the header.

6. A heater structure, comprising a relatively high pressure metal header integrally cast in one piece and formed to provide a tube sheet, an integral imperforate wall enclosing one side of said tube sheet, integral comparatively thin walled nipples projecting outwardly from said tube sheet and a stem projecting outwardly from said wall for connection of the header with a source of steam or the like, said tube sheet being provided with holes surrounded by said nipples and thin walled coils inserted in said nipples, the edges of each of said nipples being welded to the outer walls of said coils.

In testimony whereof I hereby affix my signature.

CLAUDE A. BULKELEY.